(12) United States Patent
Rafalowski et al.

(10) Patent No.: US 11,194,230 B2
(45) Date of Patent: Dec. 7, 2021

(54) VEHICLE OPTICAL DEVICE COMPRISING A HEATING ELEMENT

(71) Applicant: Aptiv Technologies Limited, St. Michael (BB)

(72) Inventors: Arkadiusz Rafalowski, Brzezinka (PL); Miroslaw Zurowski, Cracow (PL); Witold Poreda, Ruciane Nida (PL)

(73) Assignee: Aptiv Technologies Limited, St. Michael (BB)

( * ) Notice: Subject to any disclaimer, the term of this patent is extended or adjusted under 35 U.S.C. 154(b) by 224 days.

(21) Appl. No.: 16/356,392

(22) Filed: Mar. 18, 2019

(65) Prior Publication Data

US 2019/0302576 A1  Oct. 3, 2019

(30) Foreign Application Priority Data

Mar. 29, 2018 (FR) ...................... 1852746

(51) Int. Cl.
  *G02B 7/00* (2021.01)
  *G03B 17/55* (2021.01)
  (Continued)

(52) U.S. Cl.
  CPC .............. *G03B 17/55* (2013.01); *B60S 1/026* (2013.01); *G02B 7/008* (2013.01); *G02B 7/028* (2013.01);
  (Continued)

(58) Field of Classification Search
  CPC ........ G03B 17/55; G02B 7/008; G02B 7/028; G02B 27/0006; G02B 7/1815;
  (Continued)

(56) References Cited

U.S. PATENT DOCUMENTS 3,244,497 A * 4/1966 Copeland ................ C03B 11/08
  65/162
10,645,263 B2 * 5/2020 Choi ..................... H04N 5/2257
  (Continued)

FOREIGN PATENT DOCUMENTS

CN       103444166      12/2013
CN       107690594       2/2018
  (Continued)

OTHER PUBLICATIONS

"Extended European Search Report", EP Application No. 19162606.8, dated May 10, 2019, 7 pages.
"Foreign Office Action", CN Application No. 201910243068.5, dated Jul. 10, 2020, 14 pages.

*Primary Examiner* — Jennifer D. Carruth
(74) *Attorney, Agent, or Firm* — Colby Nipper PLLC (57) ABSTRACT

An optical device comprises a printed circuit card comprising an image capture electronic circuit, a metal lens support comprising at least one optical lens, the lens support being mounted on the printed circuit card so as to align, on the optical axis of the device, the image capture electronic circuit and the optical lens; the device further comprises at least one first electrically conductive heating element on and in electrical contact with the printed circuit card, between the lens support and the printed circuit card, and bearing against the lens support, the first heating element being configured to have passed through it an electrical current coming from the printed circuit card.

19 Claims, 10 Drawing Sheets

(51) Int. Cl.
*B60S 1/02* (2006.01)
*G02B 27/00* (2006.01)
*G02B 7/02* (2021.01)
*B60R 11/04* (2006.01)
*B60R 11/00* (2006.01)

(52) U.S. Cl.
CPC .......... *G02B 27/0006* (2013.01); *B60R 11/04* (2013.01); *B60R 2011/004* (2013.01)

(58) Field of Classification Search
CPC .... B60S 1/026; B60R 11/04; B60R 2011/004; H04N 5/2251; H04N 5/2254; H04N 5/2253; H04N 5/2252; H01L 2224/45015; H05B 3/84; H05B 3/845; H05B 2203/003; H05B 2203/002; H05B 2203/013; H05B 2203/017; H05B 3/24
USPC ........................................................ 359/512
See application file for complete search history.

(56) References Cited

U.S. PATENT DOCUMENTS

| | | |
|---|---|---|
| 2011/0062135 A1 | 3/2011 | Duchayne et al. |
| 2011/0249120 A1* | 10/2011 | Bingle ................. H04N 5/2252 |
| | | 348/148 |
| 2012/0170119 A1* | 7/2012 | Chu ....................... G03B 11/00 |
| | | 359/512 |
| 2014/0061438 A1 | 3/2014 | Rohde et al. |
| 2018/0176431 A1 | 6/2018 | Kim et al. |
| 2019/0353987 A1* | 11/2019 | Choi ....................... B60R 11/04 |

FOREIGN PATENT DOCUMENTS

| | | |
|---|---|---|
| CN | 108541372 | 9/2018 |
| FR | 2917939 | 12/2008 |
| JP | H04 247421 A | 9/1992 |
| WO | 2016195403 | 12/2016 |
| WO | 2018/052043 A1 | 3/2018 |

* cited by examiner

VEHICLE OPTICAL DEVICE COMPRISING A HEATING ELEMENT

TECHNICAL FIELD OF INVENTION

The present invention concerns an optical device for vehicles and more particularly an optical device comprising a heating element.

BACKGROUND OF INVENTION

Electronic units for motor vehicles located on the outside of the vehicle are subjected to environmental stresses such as cold and ice. In order not to suffer from the persistent effects of these stresses, these electronic units are generally equipped with electrical devices enabling them to be freed of the effects of these stresses. There may for example be found electronic units provided with electrical devices such as for example heating elements to combat icing.

These electrical devices are generally controlled by means of electrical wiring harnesses and connectors connecting an electronic control card and the electrical devices.

The current electrical connection solutions of these electrical devices are bulky, costly and heavy.

SUMMARY OF THE INVENTION

According to the invention, an optical device comprises a printed circuit card comprising an image capture electronic circuit, a metal lens support comprising at least one optical lens, the lens support being mounted on the printed circuit card so as to align, on the optical axis of the device, the image capture electronic circuit and the optical lens. The optical device comprises at least one first electrically conductive heating element on and in electrical contact with the printed circuit card, between the lens support and the printed circuit card, and bearing against the lens support, the first heating element being configured to have passed through it an electrical current coming from the printed circuit card.

The heating element may be a spring elastically stressed between the lens support and the printed circuit card. The optical device may comprise a second heating element arranged in a similar manner to the first heating element, the second heating element being configured to be connected to an electrical ground of the printed circuit card. The optical device may comprise an additional electrical connection element between the first heating element and the second heating element, said additional electrical connection element being pressed against the lens support.

The heating element may be a multi-turn helical spring in compression between the lens support and the printed circuit card.

The lens support may include a cylindrical base open at its bottom end and extending along the optical axis, the printed circuit card may be arranged against the bottom end of the base and therefore forming a cavity internal to the lens support, the heating element being a leaf spring adapted to bear elastically against the internal face of the cylindrical wall of the base.

The printed circuit card may comprise an opening in the vicinity of the first heating element, said opening being adapted to have inserted in it a rod for retaining the first heating element in a stress-free position against the lens support during alignment, on the optical axis of the device, of the image capture electronic circuit and the optical lens.

According to the invention, a method of assembling an optical device comprises the steps of: supplying a metal lens support comprising at least one optical lens; supplying a printed circuit card comprising an electrically conductive heating element and an image capture electronic circuit; arranging the lens support on the image capture electronic printed circuit card so as to align, on the optical axis of the device, the image capture electronic circuit and the optical lens so as to arrange the heating element between the lens support and the printed circuit card and bearing against the lens support.

The step of arranging the lens support on the printed circuit card may comprise the steps of: retaining the heating element in a position free of elastic stress against the lens support during the alignment, on the optical axis of the device, of the image capture electronic circuit and the optical lens, and arranging the heating element bearing against the lens support after alignment, on the optical axis of the device, of the image capture electronic circuit and the optical lens.

According to the invention, a method of heating lenses of the optical device described hereinabove comprises the steps of: circulation of an electrical current in the heating element of the printed circuit card so as to generate heat from the heating element bearing against the metal lens support; transmission of the heat from the heating element to the lens support; conduction of the heat through the metal lens support to each optical lens of the lens support.

Further features and advantages will appear more clearly on a reading of the following detailed description of the preferred embodiment, which is given by way of non-limiting example only and with reference to the accompanying drawings.

BRIEF DESCRIPTION OF DRAWINGS

Other features, aims and advantages of the invention will appear on reading the following detailed description with reference to the appended drawings, which are provided by way of non-limiting example and in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In order to facilitate the description, and in a non-limiting manner, an orthogonal frame of reference comprising a longitudinal axis L, a transverse axis T and a vertical axis V is defined. "Bottom", "top", "above", "below", "lower" and "upper" are defined according to the vertical direction. "Left", "right" and "lateral" orientations are defined relative to the transverse direction. Front and rear orientations are also defined relative to the longitudinal direction.

Figure 1:
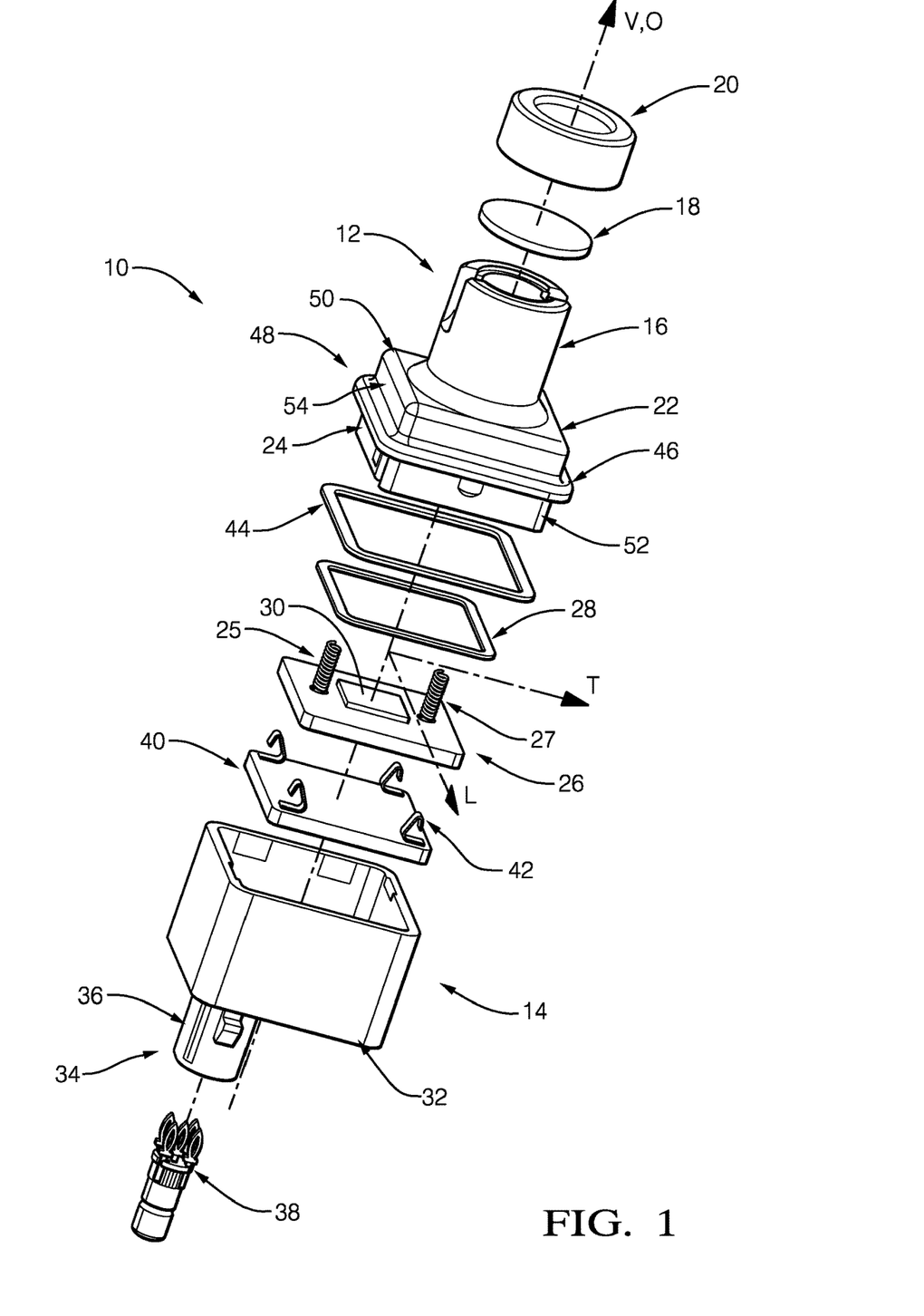
FIG. 1 is a diagrammatic exploded perspective view of the optical device according to a first embodiment of the invention.
Figure 2:
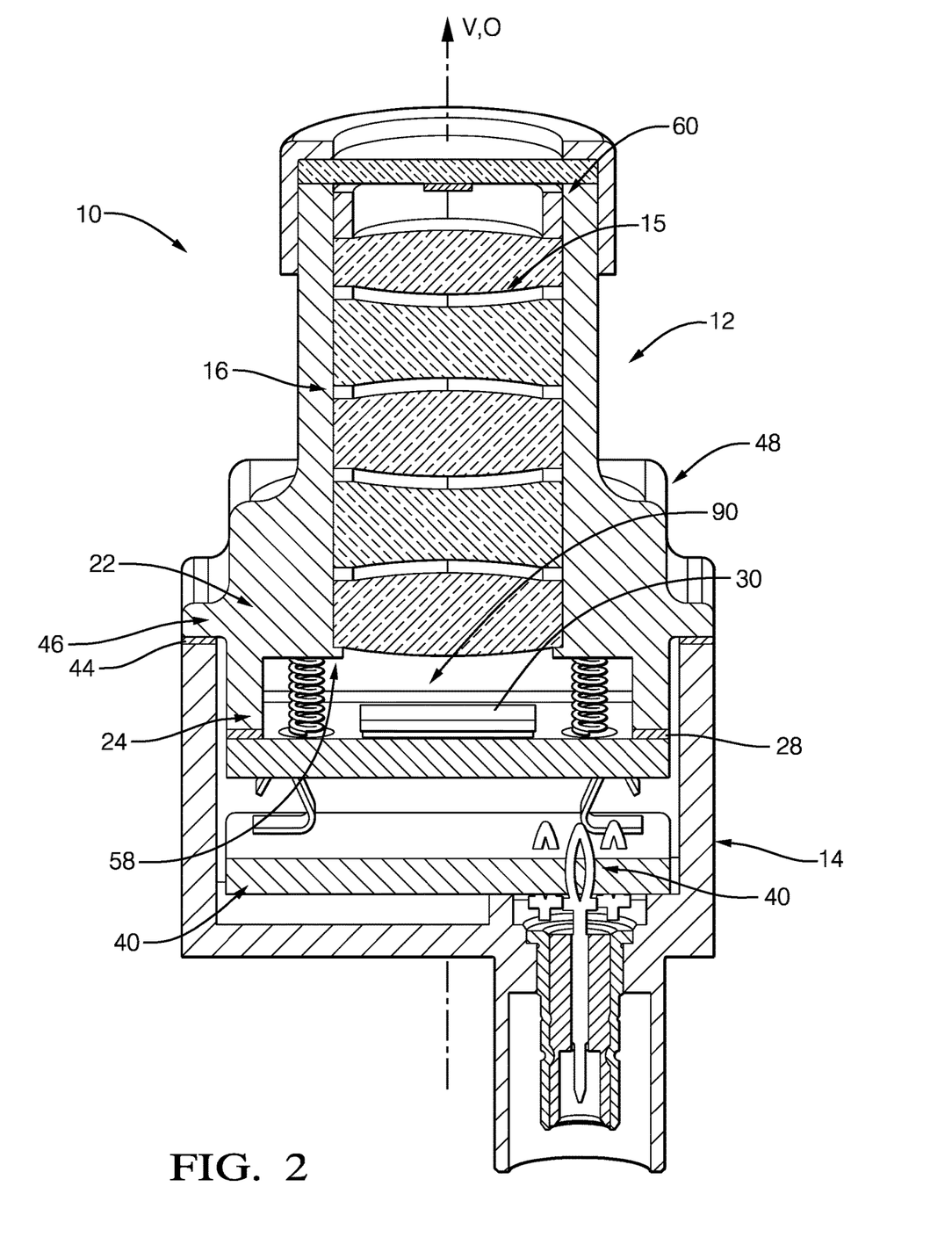
FIG. 2 is a diagrammatic perspective view in cross section of the optical device from FIG. 1 when assembled.

In FIG. 1 and FIG. 2, an optical device 10, more particularly a vehicle video camera, is shown. This type of video camera is designed to be mounted on the exterior of the vehicle and therefore to be subjected to conditions external to the vehicle such as the climate.

In FIG. 1, the optical device 10 comprises a lens support 12 and a lower casing 14.

The lens support 12 is equipped with optical lenses 15 and is surmounted by a protective glass 18 retained on the lens support 12 by a retaining cap 20. The lens support 12 includes a tubular portion 16 and a cylindrical base 22, said cylindrical base 22 being open at its bottom end 24 and comprising an upper end wall 50.

The optical device 10 comprises a first printed circuit board 26 designed to be fixed to the bottom end 24 by means of a first adhesive joint 28 so as to close hermetically the lens support 12. The first printed circuit board 26 comprises an image capture electronic circuit 30 aligned with the optical lenses 15 on the optical axis O of the optical device 10 and a first multi-turn helical spring 25 and a second multi-turn helical spring 27 arranged on the upper face of the first printed circuit board 26 and extending vertically.

The lower casing 14 is of hollow cylindrical shape with a rectangular base. The lower casing 14 includes a casing bottom 32 comprising a connector 34. The connector 34 comprises a connector body 36 in one piece with the lower casing 14 and a set of electrical terminals 38 designed to be inserted into the connector body 36 and to be in electrical contact with a second printed circuit board 40.

The second printed circuit board 40 includes electrical connection 42 to the first printed circuit board 26 and the means for electrical connection 42 are more particularly elastic tongues fixed to the second printed circuit board 40 and in contact in compression with the first printed circuit board 26. The second printed circuit board 40 may for example comprise an image processing electronic circuit, notably configured to detect the presence of mist or of ice on one of the optical lenses 15 arranged on the lens support 12. A deposit of ice or of mist can overall be present only on the optical lens 15 in contact with the air external to the optical device 10, i.e. the optical lens 15 at the external free end 60 of the lens support 12.

The lens support 12 is fixed to the lower casing 14 by means of a second adhesive joint 44. The cylindrical base 22 of the lens support 12 more particularly comprises a cylindrical external rim 46 on the exterior surface of the cylindrical wall 48 of the cylindrical base 22 of the lens support 12. The cylindrical external rim 46 is arranged between the upper end wall 50 and the bottom end 24 of the cylindrical base 22 so as to define a top portion 54 and a bottom portion 52 of the cylindrical base 22 of the lens support 12. The bottom portion 52 of the cylindrical base 22 comes to be inserted in the lower casing 14 until the cylindrical external rim 46 of the cylindrical base 22 of the lens support 12 comes to abut against the second adhesive joint 44 on the upper surface of the top end of the lower casing 14. The upper surface of the top end of the lower casing 14 therefore forms a bearing surface.

The second adhesive joint 44 may optionally be produced by a deposit of glue on the upper surface of the top end of the lower casing 14 or on the cylindrical external rim 46 of the cylindrical base 22 of the lens support 12.

In more detail, and according to FIG. 2, the tubular portion 16 of the lens support 12 extends along the optical axis O of the optical device 10 from its bottom end 58 arranged inside the cylindrical base 22 to its top end arranged outside the upper end wall 50 of the cylindrical base 22. The top end of the tubular portion 16 of the lens support 12 is the external free end 60 of the lens support 12. The tubular portion 16 of the lens support 12 arranged inside the cylindrical base 22 defines a lower section of the lens support 12 and the part of the lens support 12 arranged outside the cylindrical base 22 defines an upper section of the lens support 12. The lens support 12 shown comprises four optical lenses 15 regularly spaced overall. This arrangement allows a multi-lens structure whilst minimizing the length of the optical device 10 along the optical axis O.

According to FIG. 2, the lens support 12 is shown closed at the bottom end 24 of the cylindrical base 22 by the first printed circuit board 26 by way of the first adhesive joint 28, thus forming a cavity internal to the lens support 12. To be more precise, the cavity internal to the lens support 12 is the free space delimited by the cylindrical wall 48 of the cylindrical base 22 and the first printed circuit board 26.

The first adhesive joint 28 may optionally be produced by a deposit of glue on the lower face of the bottom end 24 of the cylindrical base 22 of the lens support 12 or by a deposit of glue at the perimeter of the first printed circuit board 26.

According to FIG. 2, the two multi-turn helical springs 25, 27 are arranged in compression against the bottom end 58 of the tubular portion 16 of the lens support 12. The two multi-turn helical springs 25, 27 are compressed vertically between the first printed circuit board 26 and the bottom end 58 of the tubular portion 16 of the lens support 12. The two multi-turn helical springs 25, 27 are preferably fixed to the first printed circuit board 26 by soldering them to it.

Figure 3:
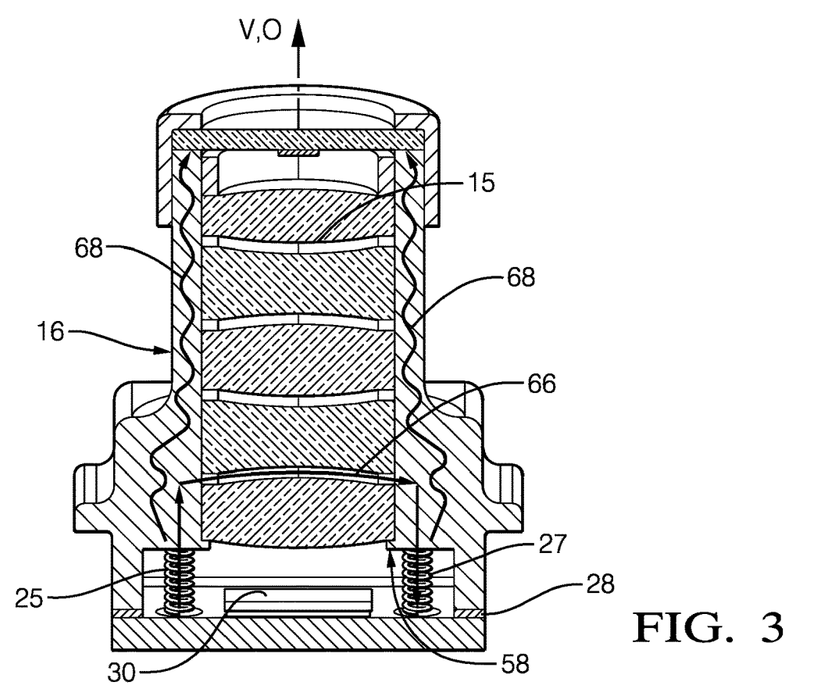
FIG. 3 is a diagrammatic perspective view in cross section of the lens support mounted on the first printed circuit card according to the first embodiment.

According to FIG. 3, the two multi-turn helical springs 25, 27 are used as electrically conductive heating elements 25, 27. According to the FIG. 3 embodiment, the two multi-turn helical springs 25, 27 have an electrical current 66 pass through them so as to produce a flow of heat 68. The two multi-turn helical springs 25, 27 are arranged so as to bear on the bottom end 58 of the tubular portion 16 of the lens support 12. The lens support 12 being made of metal, preferably of aluminium, the flow of heat 68 produced by the two multi-turn helical springs 25, 27 propagates to the bottom end 58 of the tubular portion 16 of the lens support 12. The flow of heat 68 then propagates in the whole of the lens support 12, thus propagating as far as each optical lens 15.

The internal cavity preferably forms a hermetically sealed internal cavity so as to confine all of the heat between the first printed circuit board 26 and the lens support 12.

The second adhesive joint 44 enabling the lens support 12 to be fixed to the lower casing 14 is preferably thermally insulative so as to optimize the flow of heat 68 in the lens support 12 and thus to minimize dissipation of the flow of heat 68 to the lower casing 14.

Likewise, the first adhesive joint 28 enabling the lens support 12 to be fixed to the first printed circuit board 26 is preferably thermally insulative so as to minimize the return of the flow of heat 68 to the first printed circuit board 26 from the lens support 12 by thermal conduction.

According to the first embodiment shown in FIG. 3, the electrical current 66 coming from the first printed circuit board 26 is injected through the first multi-turn helical spring 25. The end of the first multi-turn helical spring 25 in electrical contact with the first printed circuit board 26 is therefore electrically connected to a source of electrical current (not shown). The source of the electrical current 66 may non-limitingly be arranged either on the first printed circuit board 26 or on the second printed circuit board 40, the second printed circuit board 40 being in electrical contact with the first printed circuit board 26. The end of the second helical spring 27 is in electrical contact with an electrical ground of the first printed circuit board 26 so that the electrical current 66 flows from the first multi-turn helical spring 25 to the second helical spring 27. The path of the electrical current 66 (shown by the arrows) between the two multi-turn helical springs 25, 27 passes through the lens support 12, said lens support 12 being made of a conductive metal such as aluminium.

In order to maximize the electrical current 66 that can flow in the second multi-turn helical spring 27, the lens support 12 should preferably not have electrical connections to other electrical grounds. In other words, for example, and non-limitingly, the lens support 12 may be electrically insulated from the lower casing 14 by selecting an electrically insulative type second adhesive joint 44, it being possible to connect the lower casing 14 to the electrical ground of the vehicle on which the optical device 10 could be mounted.

Figure 4:
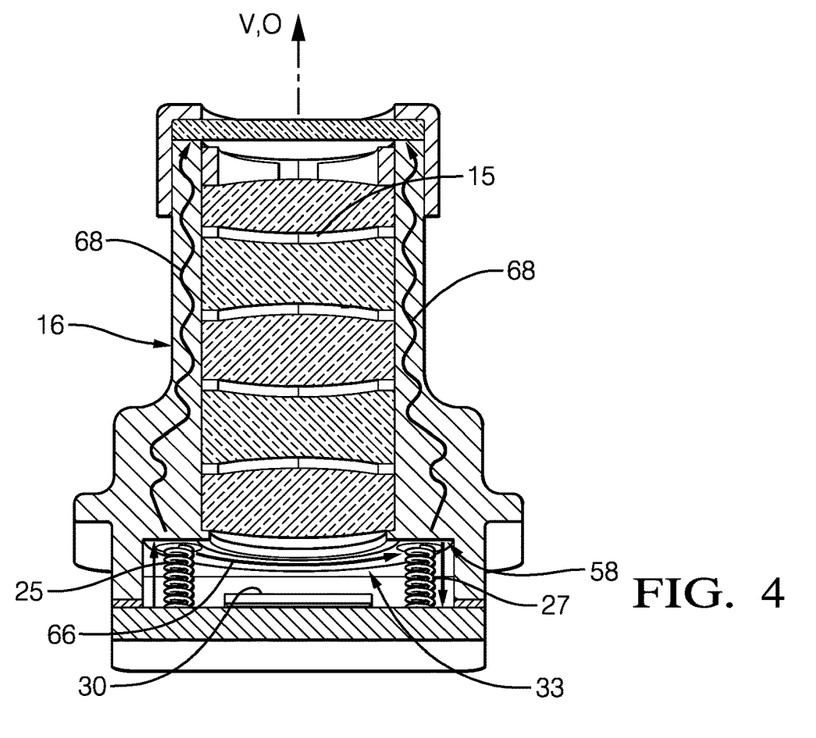
FIG. 4 is a diagrammatic perspective view in cross section of the lens support arranged on the first printed circuit card according to a second embodiment.

According to FIG. 4, and according to a second embodiment, the optical device 10 from FIG. 1 further comprises an additional electrical connection element between the first multi-turn helical spring 25 and the second multi-turn helical spring 27. This additional element forms a preferred path (shown by the arrows) for the electrical current 66 flowing from the first multi-turn helical spring 25 to the second multi-turn helical spring 27. This additional element is pressed against the lens support 12. Given the arrangement of the first multi-turn helical spring 25 and the second multi-turn helical spring 27, the additional electrical connection element is more particularly pressed against the bottom end 58 of the tubular portion 16 of the lens support 12.

Figure 5:
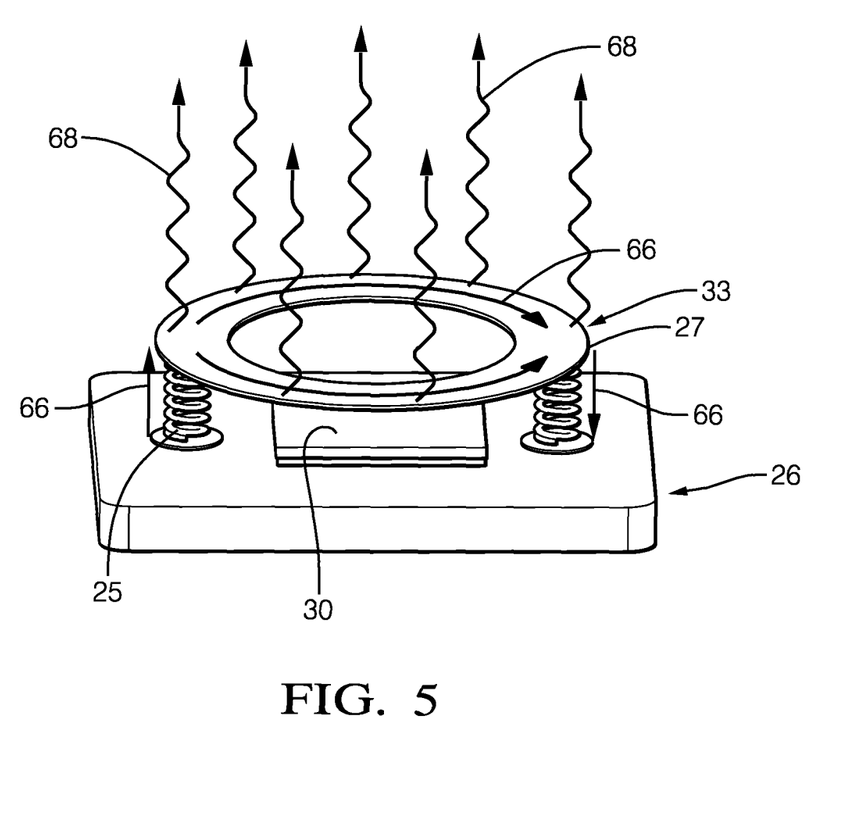
FIG. 5 is a perspective view of the first printed circuit card of the second embodiment comprising the helical springs and a cup forming the lens support heating electrical circuit.

According to the second embodiment shown in FIG. 4 and FIG. 5, the additional electrical connection element is in particular a flat metal cup 33 of hollow annular shape, i.e. open at its centre, so as to not to obstruct the image capture electronic circuit 30 aligned on the optical axis O with the optical lens 15. The annular part of the flat metal cup 33 is therefore arranged so as to be entirely pressed against the metal bottom end 58 of the tubular portion 16 of the lens support 12. To be more precise, the upper face of the plane annular part of the flat metal cup 33 is pressed against the bottom end 58 of the tubular portion 16 of the lens support 12. The flat metal cup 33 is configured so that when it passes the electrical current 66 flowing from the first multi-turn helical spring 25 to the second multi-turn helical spring 27, the flat metal cup 33 gives off the flow of heat 68 uniformly all along its circular perimeter. As a result, the flow of heat 68 produced is spread more uniformly to the lens support 12 and will heat the optical lenses 15 more effectively.

In a non-limiting manner, the annular part of the flat metal cup 33 could preferably be fixed so as to be pressed against the metal bottom end 58 of the tubular portion 16 of the lens support 12 with the aid of a thermally conductive and electrically insulative adhesive paste so as to encourage the transfer of the flow of heat 68 between the flat metal cup 33 and the lens support 12, whilst privileging a single path through the first multi-turn helical spring 25 for the electrical current 66 generated.

According to this embodiment, the two multi-turn helical springs 25, 27 are therefore arranged in compression between the first printed circuit board 26 and the lens support 12 by way of the flat metal cup 33. In other words, the top free end of each of the two multi-turn helical springs 25, 27 is therefore in direct electrical contact with the flat metal cup 33.

In particular, according to the first embodiment shown in FIG. 3 and according to the second embodiment shown in FIG. 4, the two multi-turn helical springs 25, 27 are arranged in a diametrically opposed manner around the image capture electronic circuit 30. This arrangement enables the best possible distribution of the diffusion of the flow of heat 68 coming from the two multi-turn helical springs 25, 27 to the lens support 12.

According to the first embodiment, a method of heating the optical lenses 15 of the optical device 10 enabling them to be de-iced or demisted includes a step of circulation of the electrical current 66 in the two multi-turn helical springs 25, 27 so as to generate the flow of heat 68. Thereafter, since the two multi-turn helical springs 25, 27 are pressed against the metal lens support 12, the next step consists in the transmission of the flow of heat 68 generated by the two multi-turn helical springs 25, 27 to the lens support 12 and then the optical lenses 15 are finally heated thanks to the conduction of the flow of heat 68 through the metal lens support 12 to each optical lens 15 of the lens support 12.

Although the electrical current 66 generally passes from the first multi-turn helical spring 25 to the second multi-turn helical spring 27 via the metal lens support 12, more particularly and according to the second embodiment, a step of the method of heating the optical lenses 15 of the optical device 10 may comprise a step of circulation of the electrical current 66 through an additional electrical connection element between the two multi-turn helical springs 25, 27, such as for example the hollow flat annular metal cup 33. This additional electrical connection element being arranged so as to be entirely pressed against the metal bottom end 58 of the tubular portion 16 of the lens support 12 and being configured to produce the flow of heat 68 uniformly all along its circular perimeter, the flow of heat 68 produced spreads more uniformly to the lens support 12 and will heat the optical lenses 15 more effectively.

The method may preferably comprise before the circulation of an electrical current in the two multi-turn helical springs 25, 27 so as to generate the flow of heat 68 a step consisting in detection of ice and/or of mist on the optical lenses 15 of the optical device 10. A deposit of ice or of mist can after all be present only on the optical lens 15 in contact with the air outside the optical device 10, i.e. the optical lens 15 at the external free end 60 of the lens support 12.

Figure 6:
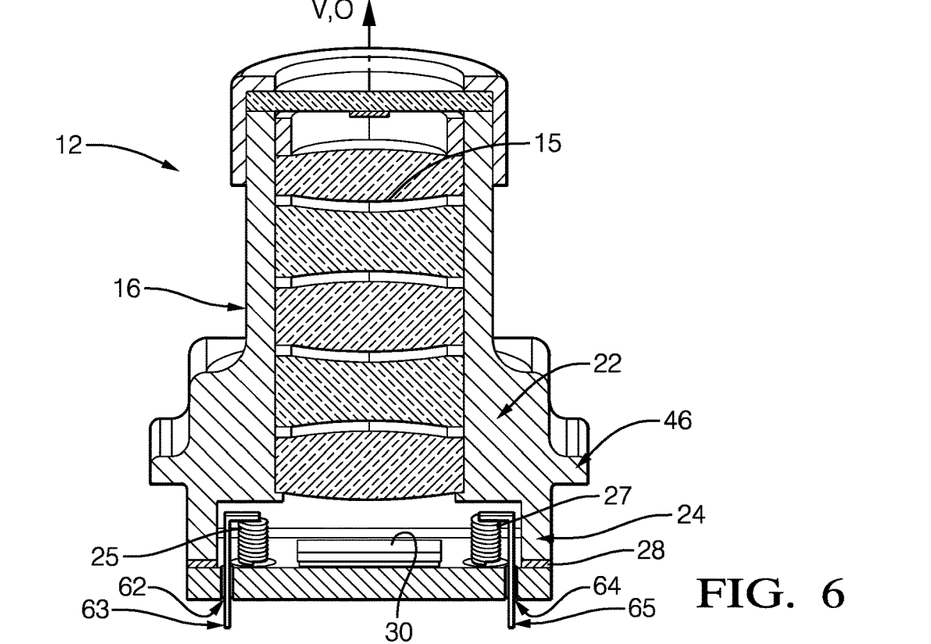
FIG. 6 is a diagrammatic perspective view in cross section of the lens support arranged on the first printed circuit card according to a third embodiment, during the step of aligning on the optical axis the lenses and the image capture electronic circuit.
Figure 7:
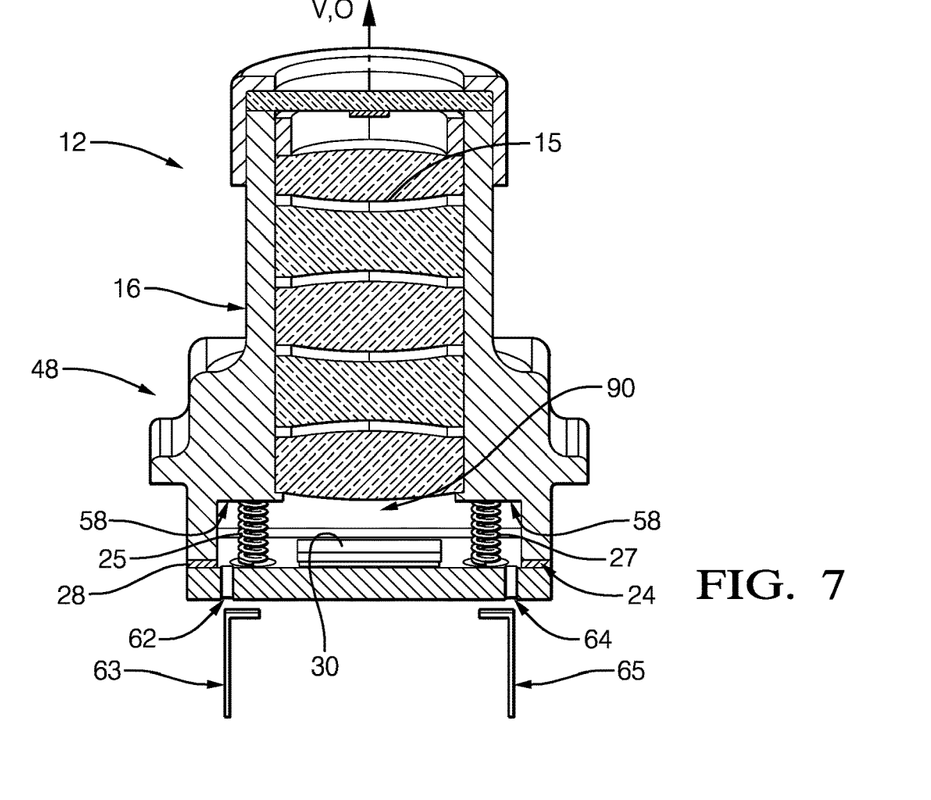
FIG. 7 is a diagrammatic perspective view in cross section of the lens support arranged on the first printed circuit card according to the third embodiment, after the step of aligning on the optical axis the lenses and the image capture electronic circuit.

The optical device 10 shown in FIG. 6 and FIG. 7 is in accordance with a particular third embodiment according to which the first printed circuit board 26 comprises a first opening 62 and a second opening 64. The first opening 62 and the second opening 64 are respectively in the immediate vicinity of the end of the first multi-turn helical spring 25 and of the second multi-turn helical spring 27 in electrical contact with the first printed circuit board 26.

According to FIG. 6, during alignment, on the optical axis O of the optical device 10, of the image capture electronic circuit 30 and the optical lenses 15, a first retaining rod 63 and a second retaining rod 65, respectively introduced into the first opening 62 and the second opening 64, respectively retain the first multi-turn helical spring 25 and the second multi-turn helical spring 27 in a position free of elastic stress against the lens support 12. In other words, the two multi-turn helical springs 25, 27 are compressed by means of the two retaining rods 63, 65 so as not to bear against the bottom end 58 of the tubular portion 16 of the lens support 12 so as not to exert additional stresses on the first printed circuit board 26 during the operation of aligning, on the optical axis O of the optical device 10, the image capture electronic device 30 and the optical lenses 15.

According to FIG. 7, when alignment is completed, the two retaining rods 63, 65 are extracted from the first printed circuit board 26 via the two openings 62, 64 so that the two multi-turn helical springs 25, 27 expand and come to bear against the bottom end 58 of the tubular portion 16 of the lens support 12.

In particular, the two openings 62, 64 may be plugged by an adhesive paste stuck to the lower face side of the first printed circuit board 26 so as to seal completely and hermetically the cavity internal to the lens support 12.

In an alternative manner to the first and third embodiments, the optical device 10 may comprise only the first multi-turn helical spring 25. In this alternative, the path of the electrical current 66 could be provided by electrically grounding the lens support 12.

In an alternative manner to the second embodiment, the optical device 10 may comprise only the first multi-turn helical spring 25. In this embodiment, the annular flat metal cup 33 could preferably conduct the electrical current 66 to an electrical ground. In this alternative embodiment, the flat metal cup 33 may be in direct contact with the lens support 12 at a particular point, preferably that farthest from the first multi-turn helical spring 25, the rest of the flat metal cup 33 being pressed against the lens support 12 by means of an electrically insulative adhesive.

According to the first embodiment, a method of assembling the optical device 10 includes a step of supplying the metal lens support 12 comprising the optical lenses 15 and supplying the first printed circuit board 26 comprising the two electrically conductive multi-turn helical springs 25, 27 and the image capture electronic circuit 30. Another assembly step consists in arranging the lens support 12 on the first printed circuit board 26 and aligning, on the optical axis O of the optical device 10, the image capture electronic circuit 30 and the optical lenses 15 with the free top end of the two multi-turn helical springs 25, 27 in compression between the lens support 12 and the first printed circuit board 26.

In order to facilitate the alignment, on the optical axis O of the optical device 10, of the image capture electronic circuit 30 and the optical lenses 15, and according to the third embodiment, the step of arranging the lens support 12 on the first printed circuit board 26 may comprise a step of retaining the two multi-turn helical springs 25, 27 in a position free of elastic stress against the lens support 12. Thereafter, when alignment has been completed and the first printed circuit board 26 has preferably been fixed to the lens support 12 by the first adhesive joint 28, the method consists in releasing the two multi-turn helical springs 25, 27 from retention so that their free top end bears against the lens support 12, more particularly against the bottom end 58 of the tubular portion 16 of the lens support 12. The retention of the two multi-turn helical springs 25, 27 in the position free of elastic stress against the lens support 12, to be more precise against the bottom end 58 of the tubular portion 16 of the lens support 12, and releasing the two multi-turn helical springs 25, 27 from the retention of may be effected by means of two retaining rods 63, 65 introduced into and then extracted from the cavity internal to the lens support 12 via the two openings 62, 64 of the first printed circuit board 26.

A supplementary step of plugging the two openings 62, 64 of the first printed circuit board 26, notably by gluing an adhesive paste stuck to the lower face side of the first printed circuit board 26, may be envisaged so as to render the cavity internal to the lens support 12 totally and hermetically sealed.

FIGS. 8 to 14 represent a fourth, a fifth and a sixth embodiment of the present invention, being respectively alternatives to the first embodiment, the second embodiment and the third embodiment.

All these alternatives consist in using a first elastic leaf spring 29 and a second elastic leaf spring 31 instead of the first multi-turn helical spring 25 and the second multi-turn helical spring 27 as heating elements 29, 31 for the optical device 10. The other elements of the optical device 10 are identical to the embodiments described above.

Figure 8:
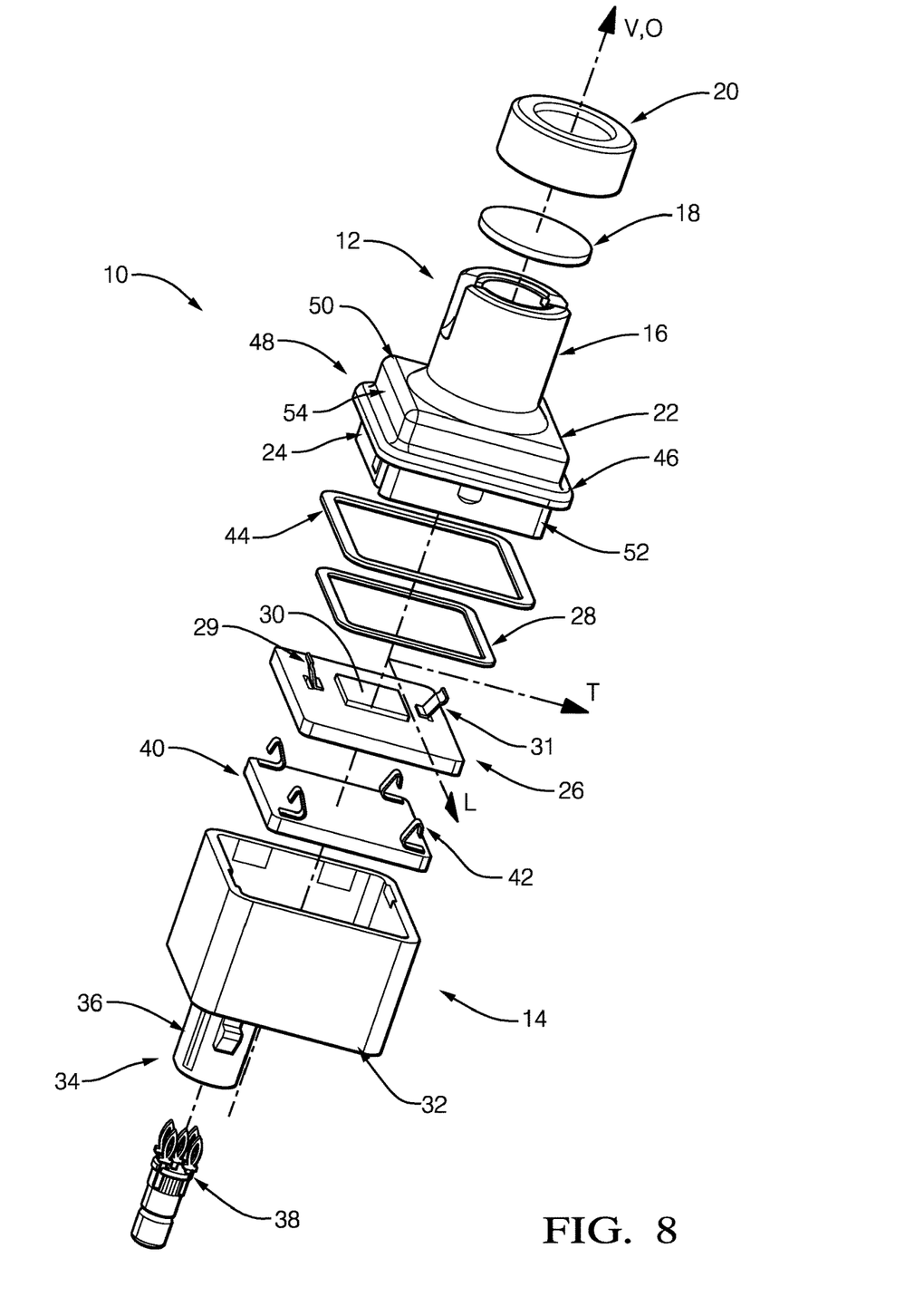
FIG. 8 is a diagrammatic exploded perspective view of the optical device according to a fourth embodiment of the invention.

According to FIG. 8, a first printed circuit board 26 comprises the image capture electronic circuit 30 aligned with the optical lenses 15 on the optical axis O of the optical device 10 and two leaf springs 29, 31 arranged on the upper face of the first printed circuit board 26 and extending obliquely toward the rim of the first printed circuit board 26. The first leaf spring 29 and the second leaf spring 31 are more particularly arranged on either side of the image capture electronic circuit 30 and each of them is oriented obliquely relative to the vertical axis V toward the exterior of the first printed circuit board 26. In other words, the first leaf spring 29 and the second leaf spring 31 are arranged opposite one another, on either side of the image capture electronic circuit 30, and oriented obliquely in opposite directions to one another toward the edge of the first printed circuit board 26. The two leaf springs 29, 31 are preferably fixed to the first printed circuit board 26 by soldering them to it. The two leaf springs 29, 31 are configured to come to bear against the internal face 61 of the cylindrical wall 48 of the cylindrical base 22 of the lens support 12.

Figure 9:
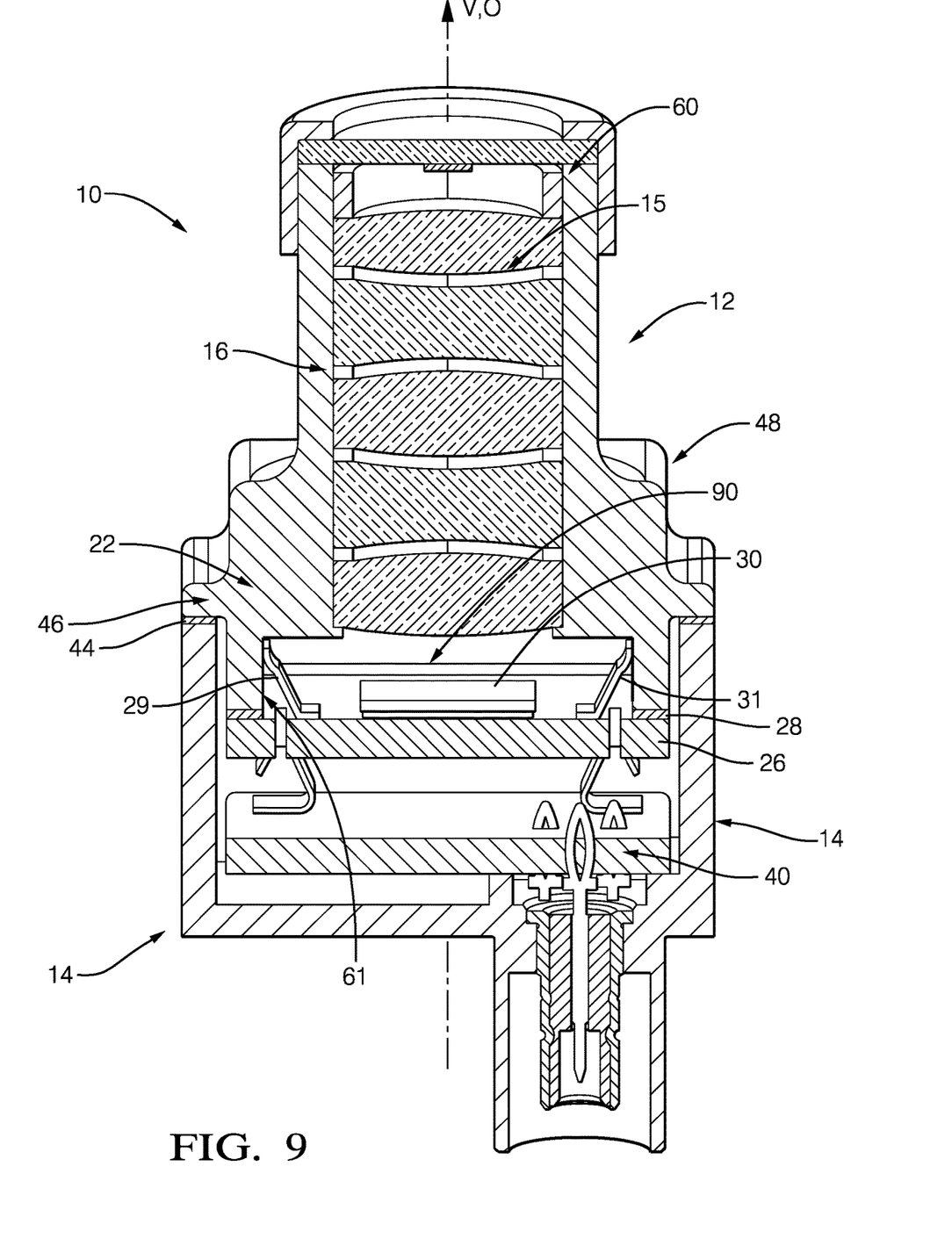
FIG. 9 is a diagrammatic perspective view in cross section of the optical device from FIG. 8 when assembled.

To be more precise, and according to FIG. 9, when the first printed circuit board 26 is arranged against the bottom end 24 of the cylindrical base 22 of the lens support 12, each leaf spring 29, 31 is arranged to bear elastically against the internal face 61 of the cylindrical wall 48 of the cylindrical base 22. The force with which the leaf springs 29, 31 bear against the internal face 61 of the cylindrical wall 48 of the cylindrical base 22 offers improved retention and therefore greater stability of the first printed circuit board 26 mounted against the lens support 12, thus enabling greater stability of the alignment on the optical axis O of the optical device 10 of the image capture electronic circuit 30 and the optical lenses 15.

The elements for fixing the first printed circuit board 26 against the lens support 12, i.e. the first adhesive joint 28, the elastic tongues fixed to the second printed circuit board 40 and in contact in compression with the first printed circuit board 26 and the two leaf springs 29, 31, offer simple assembly of the optical device 10 compared to screw fixings, which are costly and necessitate additional screwing steps during assembly of the optical device 10.

Figure 10:
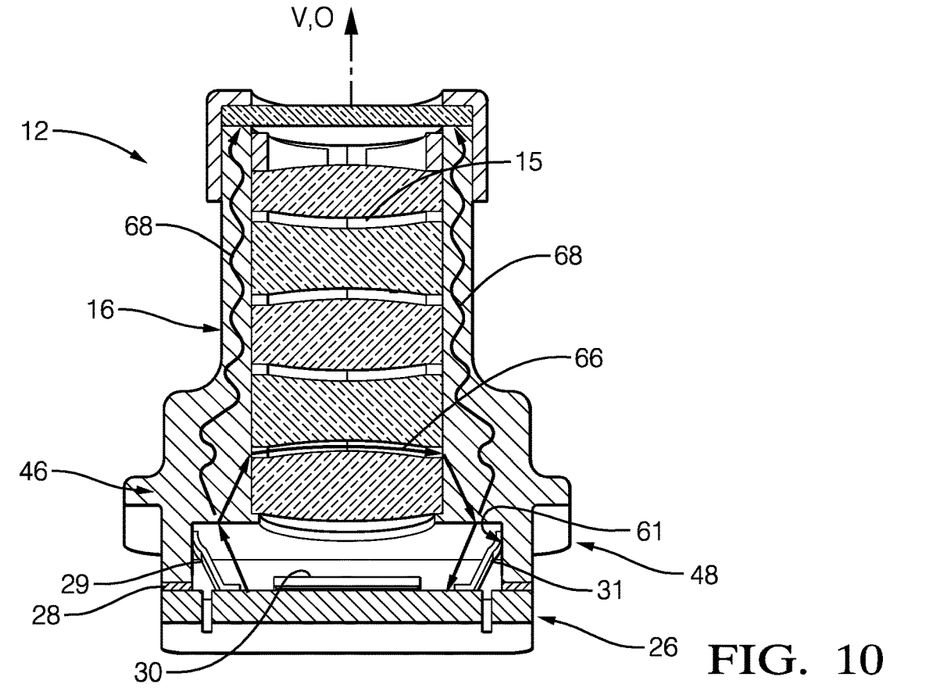
FIG. 10 is a diagrammatic perspective view in cross section of the lens support mounted on the first printed circuit card according to the fourth embodiment.

According to the fourth embodiment shown in FIG. 10, the electrical current 66 coming from the first printed circuit board 26 is injected through the first leaf spring 29. The end of the first leaf spring 29 in electrical contact with the first printed circuit board 26 is therefore electrically connected to a source of electrical current (not shown). The source of the electrical current 66 may non-limitingly be arranged both on the first printed circuit board 26 and on the second printed circuit board 40, the second printed circuit board 40 being in electrical contact with the first printed circuit board 26. The end of the second leaf spring 31 arranged on the first printed circuit board 26 is in electrical contact with an electrical ground of the first printed circuit board 26 so that the electrical current 66 circulates from the first leaf spring 29 to the second leaf spring 31. The electrical path (shown by the arrows) of the electrical current 66 between the two leaf springs 29, 31 is via the lens support 12, said lens support 12 being made of a conductive metal such as aluminium.

In order to maximize the electrical current 66 able to flow in the second leaf spring 31, the lens support 12 must not have other electrical connections to other electrical grounds. In other words, the lens support 12 may non-limitingly and for example be electrically insulated from the lower casing 14 by selecting an electrical insulation type second adhesive joint 44 and the lower casing 14 may be connected to the ground of the vehicle on which the optical device 10 could be mounted.

Figure 11:
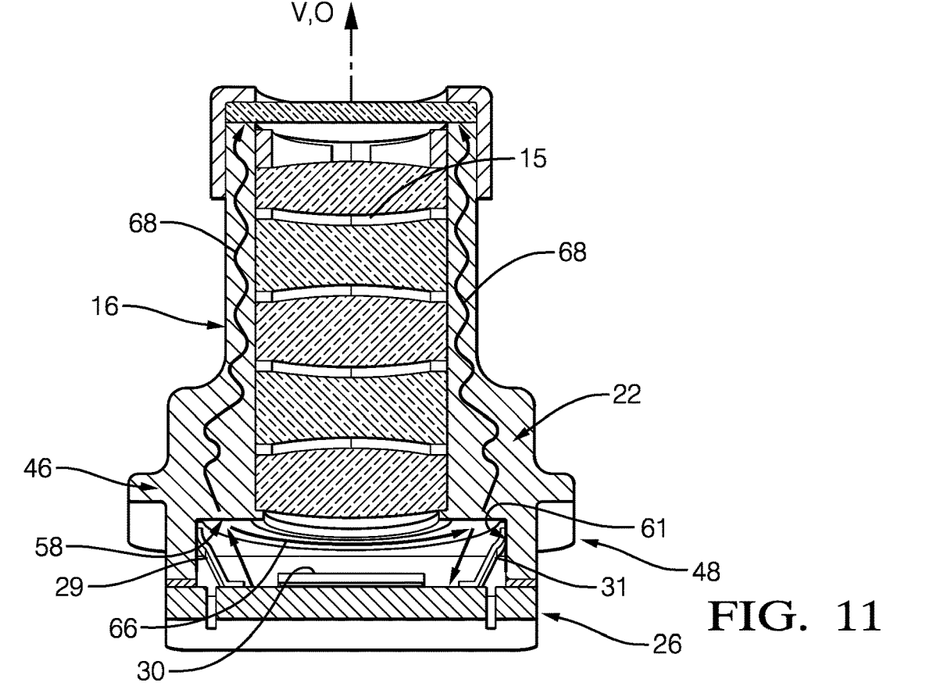
FIG. 11 is a diagrammatic perspective view in cross section of the lens support arranged on the first printed circuit card according to a fifth embodiment.

According to FIG. 11, and according to a fifth embodiment, the optical device 10 from FIG. 8 further comprises another additional electrical connection element between the first leaf spring 29 and the second leaf spring 31. This other additional element forms a preferred path (shown by the arrows) for the electrical current 66 flowing from the first leaf spring 29 to the second leaf spring 31. This other additional element is pressed against the lens support 12. According to the arrangement of the first leaf spring 29 and the second leaf spring 31, the other additional electrical connection element is more particularly pressed against the bottom end 58 of the tubular portion 16 of the lens support 12.

Figure 12:
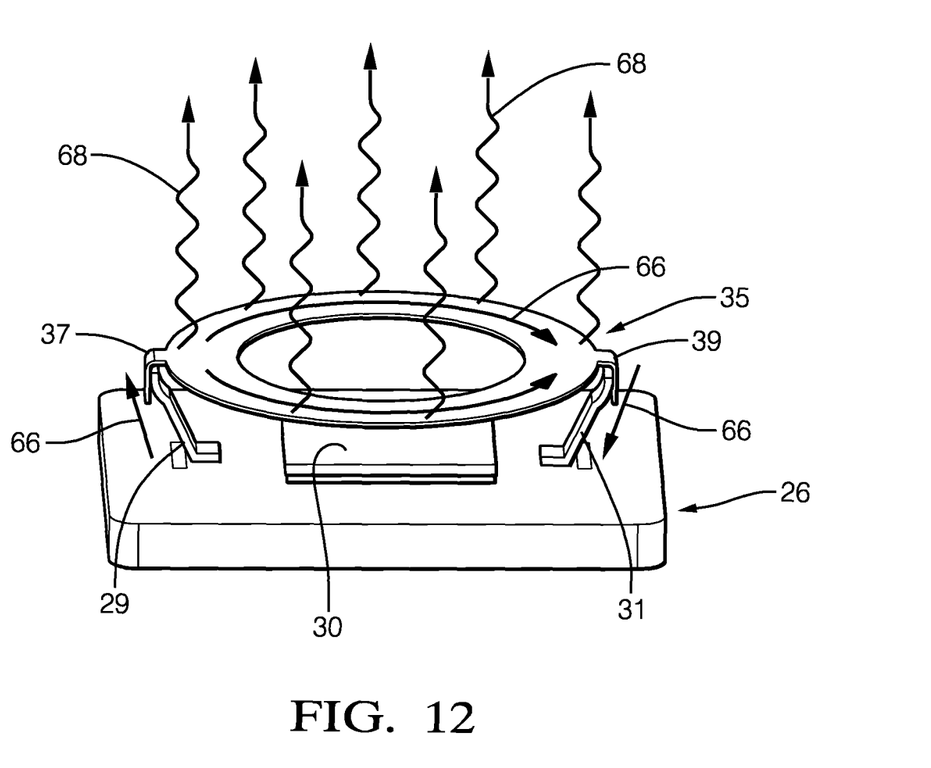
FIG. 12 is a perspective view of the first printed circuit card of the fifth embodiment comprising the leaf springs and another cup forming the lens support heating electrical circuit.

According to one particular embodiment shown in FIG. 11 and in FIG. 12, the other additional electrical connection element is another flat metal cup 35 of hollow annular shape, i.e. open at its centre, so as not to obstruct the image capture electronic circuit 30 aligned on the optical axis with the optical lenses 15. The other flat metal cup 35 further includes a first lug 37 and a second lug 39 extending globally vertically downward from the exterior perimeter of the annular part of the other flat metal cup 35. The two lugs 37, 39 are preferably arranged in a diametrically opposite manner along the exterior perimeter of the annular part of the other flat metal cup 35. Each lug 37, 39 includes a bearing surface against which the free end of a leaf spring 29 comes to bear elastically, thus exerting a bearing force guaranteeing the electrical contact between each leaf spring 29, 31 and the other flat metal cup 35.

The annular part of the other flat metal cup 35 is therefore arranged so as to be pressed completely against the metal bottom end 58 of the tubular portion 16 of the lens support 12. The other flat metal cup 35 is configured so that when it has the electrical current 66 flowing from the first leaf spring 29 to the second leaf spring 31 passed through it the other annular flat metal cup 35 gives off the flow of heat 68 uniformly all along its circular perimeter. As a result, the flow of heat 68 produced spreads more uniformly toward the lens support 12 and will heat the optical lenses 15 more effectively.

According to the fourth embodiment, a method of heating the optical lenses 15 of the optical device 10 enabling de-icing or demisting thereof includes a step of circulation of the electrical current 66 in the two leaf springs 29, 31 so as to generate the flow of heat 68. Thereafter, since the two leaf springs 29, 31 bear against the metal lens support 12, the next step consists in the transmission of the flow of heat 68 generated by the two leaf springs 29, 31 to the lens support 12 and then and finally the heating of the optical lenses 15 is produced thanks to the conduction of the flow of heat 68 through the metal lens support 12 as far as each optical lens 15 of the lens support 12.

Although the electrical current 66 generally passes from the first leaf spring 29 to the second leaf spring 31 via the metal lens support 12, more particularly and according to the fifth embodiment a step of the method of heating the optical lenses 15 of the optical device 10 may comprise a step of circulation of the electrical current 66 through an additional electrical connection element between the two leaf springs 29, 31 such as for example the other hollow annular flat metal cup 35. This additional electrical connection element being arranged to be pressed completely against the metal bottom end 58 of the tubular portion 16 of the lens support 12 and being configured to produce flow of heat 68 uniformly along all of its circular perimeter, the flow of heat 68 produced spreads more uniformly to the lens support 12 and will heat the optical lenses 15 more effectively.

The method may preferably comprise before the circulation of an electrical current in the two leaf springs 29, 31 so as to generate the flow of heat 68 a step consisting in detection of ice and/or of mist on the optical lenses 15 of the optical device 10. A deposit of ice or of mist can generally be present only on the optical lens 15 in contact with the air external to the optical device 10, i.e. the optical lens 15 arranged at the external free end 60 of the lens support 12.

Figure 13:
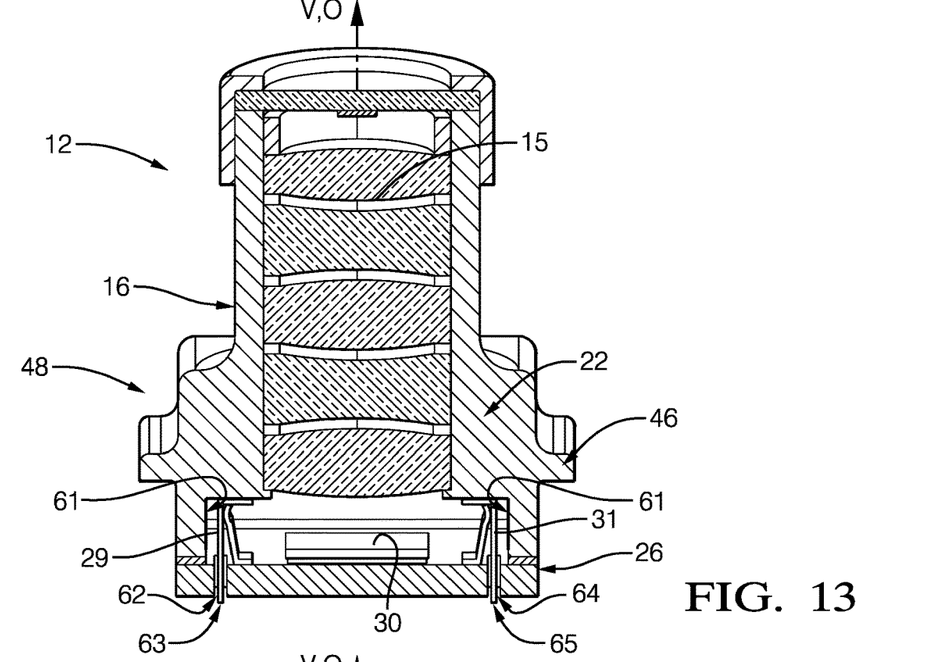
FIG. 13 is a diagrammatic perspective view in cross section of the lens support arranged on the first printed circuit card according to a sixth embodiment, during the step of aligning on the optical axis the lenses and the image capture electronic circuit.
Figure 14:
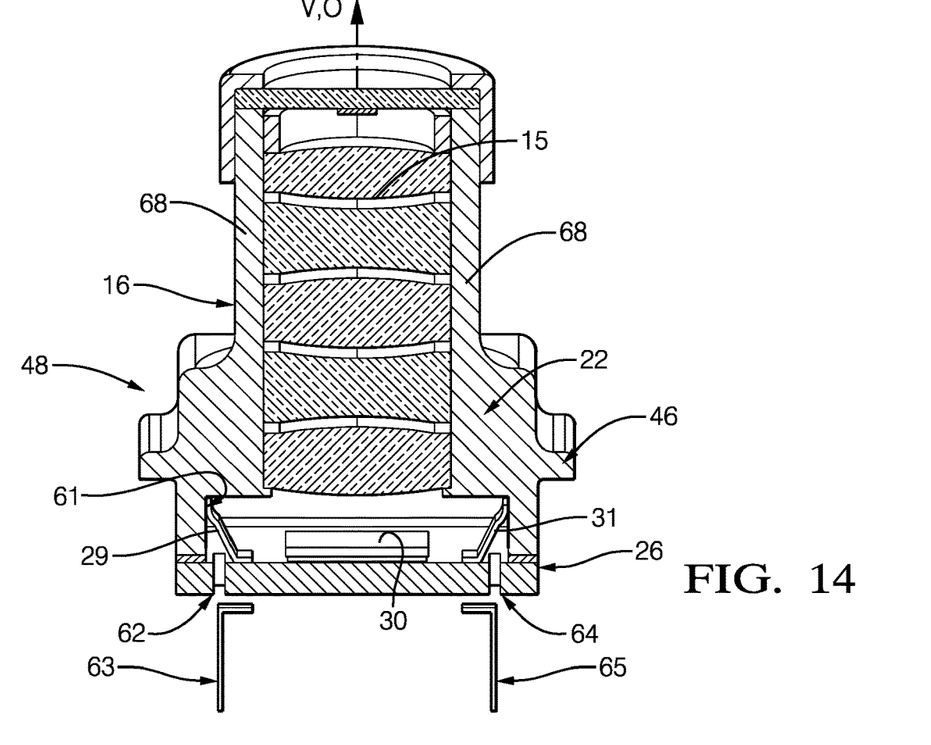
FIG. 14 is a diagrammatic perspective view in cross section of the lens support arranged on the first printed circuit card according to the sixth embodiment, after the step of aligning on the optical axis the lenses and the image capture electronic circuit.

According to FIG. 13 and FIG. 14, the optical device 10 is represented in the sixth particular embodiment in which the first printed circuit board 26 comprises two openings 62, 64 arranged in a similar manner to the third embodiment. The first opening 62 and the second opening 64 are respectively in the immediate vicinity of the end of the first leaf spring 29 and of the second leaf spring 31 in electrical contact with the first printed circuit board 26. To be more precise, the first opening 62 and the second opening 64 are respectively under the oblique portions of the first leaf spring 29 and of the second leaf spring 31, so that the introduction of a retaining rod 63, 65 into one of the openings 62, 64 causes vertical straightening of the leaf spring 29 associated with the opening 62.

According to FIG. 13, during the alignment on the optical axis O of the optical device 10 of the image capture electronic circuit 30 and the optical lens 15, the first retaining rod 63 and the second retaining rod 65, introduced into the first opening 62 and the second opening 64, respectively, retain the first leaf spring 29 and the second leaf spring 31, respectively, in a position with no elastic stress against the lens support 12, to be more precise so as not to bear against the internal face 61 of the cylindrical wall 48 of the cylindrical base 22 of the lens support 12. In other words, the two leaf springs 29, 31 are held globally vertical by means of the two retaining rods 63, 65 so as not to bear against the internal face 61 of the cylindrical wall 48 of the cylindrical base 22 of the lens support 12 so as not to exert additional stresses on the first printed circuit board 26 during the operation of alignment on the optical axis O of the optical device 10 of the image capture electronic circuit 30 and the optical lenses 15.

According to FIG. 14, when alignment is completed, each retaining rod 63, 65 is extracted from the first printed circuit board 26 via its associated opening 62, 64 so that, because of their elasticity, each of the two leaf springs 29, 31 comes to bear against the internal face 61 of the cylindrical wall 48 of the cylindrical base 22 of the lens support 12.

It is to be noted that the two retaining rods 63, 65 of this sixth embodiment may be identical to the retaining rods 63, 65 of the third embodiment. In the case of the third embodiment, the top end of the two retaining rods 63, 65 having a curved shape enables compression of the two multi-turn helical springs 25, 27 so that the two multi-turn helical springs 25, 27 do not bear against the bottom end 58 of the tubular portion 16 of the lens support 12, whereas in the sixth embodiment it is the vertical part of the two retaining rods 63, 65 that holds the two leaf springs 29, 31 away from the position bearing against the internal face 61 of the cylindrical wall of the cylindrical base 22 of the lens support 12.

In an alternative manner to the fourth and to the sixth embodiment, the optical device 10 may comprise only the first leaf spring 29. In this alternative, the path of the electrical current 66 could be provided by electrically grounding the lens support 12.

In an alternative manner to the fifth embodiment, the optical device 10 may comprise only the first leaf spring 29. For this embodiment, the other annular flat metal cup 35 could preferably conduct the electrical current 66 to an electrical ground. In this alternative embodiment, the annular part of the other flat metal cup 35 may be in direct contact with the lens support 12 at a particular point, preferably that farthest from the first leaf spring 29, the rest of the annular part of the other flat metal cup 35 being pressed against the lens support 12 by means of an electrically insulative adhesive.

According to the fourth embodiment, a method of assembling the optical device 10 includes a step of supplying the metal lens support 12 comprising the optical lenses 15 and supplying the first printed circuit board 26 comprising the two electrically conductive leaf springs 29, 31 and the image capture electronic circuit 30. Another assembly step consists in arranging the lens support 12 on the first printed circuit board 26 and aligning on the optical axis O of the optical device 10 the image capture electronic circuit 30 and the optical lens 15 whilst arranging the free top end of the two leaf springs 29, 31 to bear elastically against the internal face 61 of the cylindrical wall 48 of the cylindrical base 22 of the lens support 12.

In order to facilitate the alignment on the optical axis O of the optical device 10 of the image capture electronic circuit 30 and the optical lens 15, and according to the sixth embodiment, the step of arranging the lens support 12 on the first printed circuit board 26 may comprise a step of retaining the two leaf springs 29, 31 in a position with no elastic stress against the lens support 12, more particularly bearing elastically with no elastic stress against the internal face 61 of the cylindrical wall 48 of the cylindrical base 22 of the lens support 12.

Then, when alignment has been completed and the first printed circuit board 26 has preferably been fixed to the lens support 12 by the first adhesive joint 28, the method consists in releasing the two leaf springs 29, 31 from retention so that their free top end bears against the internal face 61 of the cylindrical wall 48 of the cylindrical base 22 of the lens support 12. The retention of the two leaf springs 29, 31 in the position with no elastic stress against the lens support 12, to be more precise against the internal face 61 of the cylindrical wall 48 of the cylindrical base 22 of the lens support 12, and the releasing of the two leaf springs 29, 31 from retention may be effected by means of two retaining rods 63, 65 introduced into and then extracted from the cavity internal to the lens support 12 via the two openings 62, 64 of the first printed circuit board 26.

A supplementary step of plugging the two openings 62, 64 of the first printed circuit board 26, notably by gluing an adhesive paste stuck to the lower face side of the first printed circuit board 26, may be envisaged so as to render the cavity internal to the lens support 12 totally and hermetically sealed.

While this invention has been described in terms of the preferred embodiments thereof, it is not intended to be so limited, but rather only to the extent set forth in the claims that follow.

We claim:

1. An optical device comprising:
   a printed circuit board comprising an image capture electronic circuit;
   a metal lens support comprising at least one optical lens, the lens support being mounted on the printed circuit board so as to align, on an optical axis of the optical device, the image capture electronic circuit, and the optical lens; and
   at least one first electrically conductive heating element on and in electrical contact with the printed circuit board, between the lens support and the printed circuit board, and bearing against the lens support, the first heating element configured as a spring, and elastically stressed between the lens support and the printed circuit board, and further configured to pass an electrical current coming from the printed circuit board.

2. The optical device according to claim 1, wherein the optical device comprises a second heating element arranged in a similar manner to the first heating element, the second heating element being configured to be connected to an electrical ground of the printed circuit board.

3. The optical device according to claim 2, wherein the optical device comprises an additional electrical connection element between the first heating element and the second heating element, said additional electrical connection element being pressed against the lens support.

4. The optical device according to claim 1, wherein the heating element is a multi-turn helical spring in compression between the lens support and the printed circuit board.

5. The optical device according to claim 1, wherein the lens support includes a cylindrical base open at its bottom end and extending along the optical axis, the printed circuit board being arranged against the bottom end of the cylindrical base and therefore forming a cavity internal to the lens support, and in that the heating element is a leaf spring adapted to bear elastically against the internal face of the cylindrical wall of the cylindrical base.

6. The optical device according to claim 1, wherein the printed circuit board comprises an opening in the vicinity of the first heating element, said opening being adapted to have inserted in it a rod for retaining the first heating element in a stress-free position against the lens support during alignment, on the optical axis of the optical device, of the image capture electronic circuit and the optical lens.

7. A method of assembling an optical device, said method comprising:
   supplying a metal lens support comprising at least one optical lens;
   supplying a printed circuit board comprising a first electrically conductive heating element configured as a spring, and elastically stressed between the lens support and the printed circuit board, and an image capture electronic circuit; and
   arranging the lens support on the image capture electronic circuit electronic printed circuit board so as to align, on the optical axis of the optical device, the image capture electronic circuit and the optical lens so as to arrange the first heating element between the lens support and the printed circuit board and bearing against the lens support.

8. The method according to claim 7, wherein arranging the lens support on the printed circuit board comprises:
   retaining the heating element in a position free of elastic stress against the lens support during the alignment, on the optical axis of the optical device, of the image capture electronic circuit and the optical lens; and
   arranging the heating element bearing against the lens support after alignment, on the optical axis of the optical device, of the image capture electronic circuit and the optical lens.

9. The method of assembling the optical device of claim 7, the method further comprising:
   supplying the printed circuit further comprising a second electrically conducive heating element; and
   connecting the second heating element to an electrical ground of the printed circuit board.

10. The method of assembling the optical device of claim 7, the method further comprising:
    supplying an additional electrical connection element between the first heating element and the second heating element; and
    pressing the additional electrical connection against the lens support.

11. The method of assembling the optical device of claim 7, the method further comprising supplying a printed circuit board comprising the first electrically conductive heating element, the first electrically conductive heating element being a multi-turn helical spring in compression between the lens support and the printed circuit board.

12. The method of assembling the optical device of claim 7, the method further comprising:
    supplying the metal lens support, the metal lens support includes a cylindrical base open at its bottom end and extending along the optical axis; and
    arranging the printed circuit board against the bottom end of the cylindrical base and therefore forming a cavity internal to the lens support, and in that the heating element is a leaf spring adapted to bear elastically against the internal face of the cylindrical wall of the cylindrical base.

13. The method of assembling the optical device of claim 7, the method further comprising supplying the printed circuit board, the printed circuit board further comprising an opening in the vicinity of the first heating element, said opening being adapted to have inserted in it a rod for retaining the first heating element in a stress-free position against the lens support during alignment, on the optical axis of the optical device, of the image capture electronic circuit and the optical lens.

14. A method of heating lenses of an optical device, the optical device comprising:
    a printed circuit board comprising an image capture electronic circuit;

a metal lens support comprising at least one optical lens, the lens support being mounted on the printed circuit board so as to align, on an optical axis of the optical device, the image capture electronic circuit, and the optical lens; and at least one first electrically conductive heating element on and in electrical contact with the printed circuit board, between the lens support and the printed circuit board, and bearing against the lens support, the first heating element configured as a spring, and elastically stressed between the lens support and the printed circuit board, and further configured to pass an electrical current coming from the printed circuit board, said method comprising:

circulating electrical current in the heating element of the printed circuit board so as to generate a flow of heat from the heating element bearing against the metal lens support;

transmitting heat from the heating element to the lens support; and conducting heat through the metal lens support to each optical lens of the lens support.

15. The method of heating lenses of the optical device of claim 14, the optical device further comprising a second heating element arranged in a similar manner to the first heating element, and said method further comprising connecting the second heating element to an electrical ground of the printed circuit board.

16. The method of heating lenses of the optical device of claim 15, the optical device further comprising an additional electrical connection element between the first heating element and the second heating element, said method further comprising pressing the additional electrical connection against the lens support.

17. The method of heating lenses of the optical device of claim 14, the heating element being a multi-turn helical spring in compression between the lens support and the printed circuit board.

18. The method of heating lenses of the optical device of claim 14, wherein the lens support further includes a cylindrical base open at its bottom end and extending along the optical axis, said method further comprising:

arranging the printed circuit board against the bottom end of the cylindrical base and therefore forming a cavity internal to the lens support; and adapting the heating element to bear elastically against the internal face of the cylindrical wall of the cylindrical base, the heating element being a leaf spring.

19. The method of heating lenses of the optical device of claim 14, the printed circuit board further comprising an opening in the vicinity of the first heating element, the opening being adapted to have inserted in it a rod for retaining the first heating element in a stress-free position against the lens support, the method further comprising:

inserting a rod into the opening to retain the first heating element in a stress-free position;

aligning, on the optical axis of the optical device, the image capture electronic circuit and the optical lens; and removing the rod once the alignment is complete.

* * * * *